UNITED STATES PATENT OFFICE.

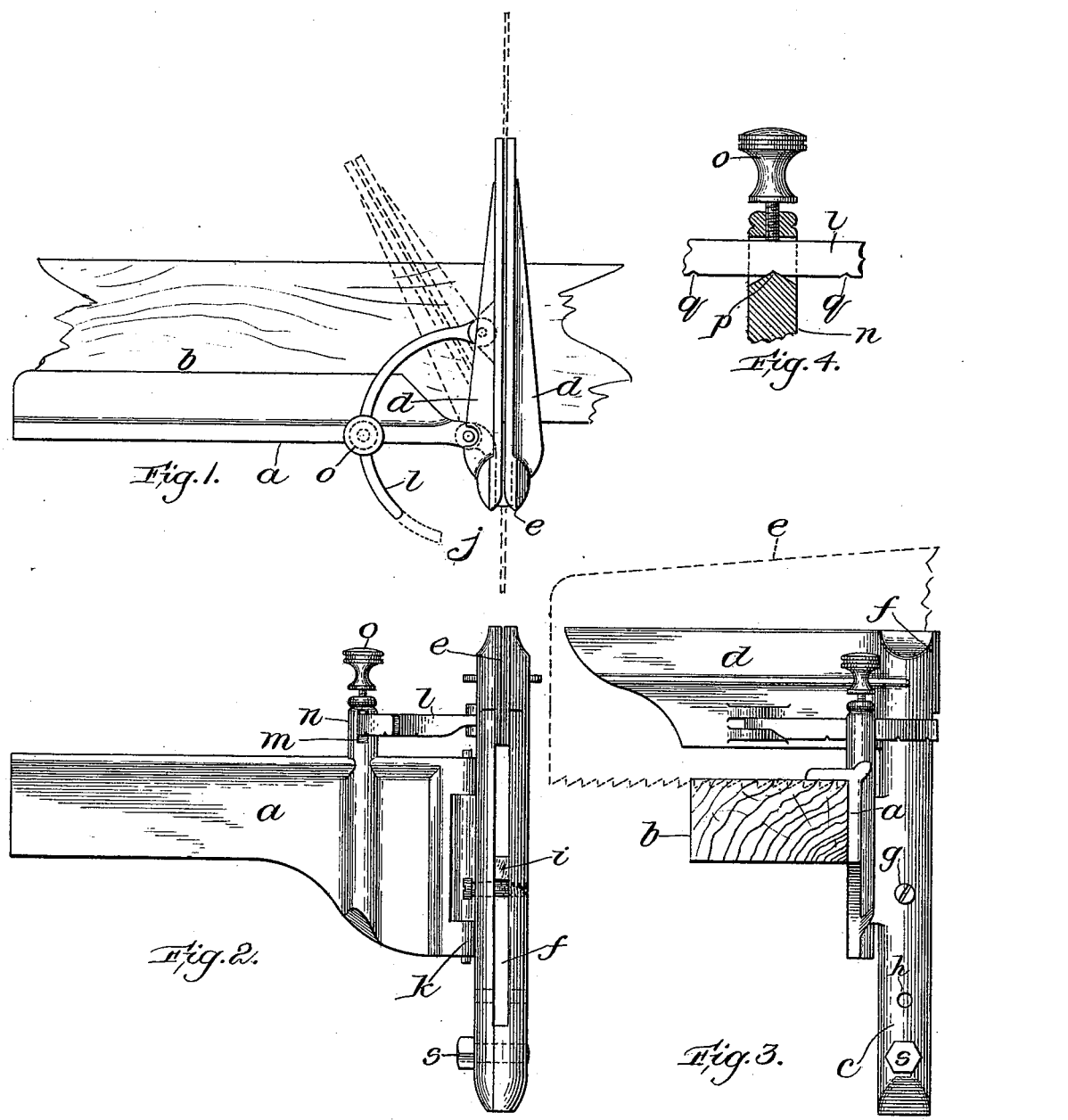

CHARLES O. SEAVEY, OF SOUTH FRAMINGHAM, MASSACHUSETTS, ASSIGNOR TO JOHN A. THOMPSON, FRANK W. CHENEY, AND JAMES S. THOMPSON, OF LOWELL, MASSACHUSETTS.

SAW-GUIDE FOR SAWING MATERIAL FOR FORMING MITER-JOINTS.

SPECIFICATION forming part of Letters Patent No. 622,190, dated March 28, 1899.

Application filed December 17, 1898. Serial No. 699,580. (No model.)

*To all whom it may concern:*

Be it known that I, CHARLES O. SEAVEY, of South Framingham, in the county of Middlesex and State of Massachusetts, have invented certain new and useful Improvements in Saw-Guides for Sawing Material to Form Miter-Joints, of which the following is a description sufficiently full, clear, and exact to enable those skilled in the art to which it appertains or with which it is most nearly connected to make and use the same.

This invention has relation to devices for guiding or controlling the position or line of action of a hand saw in sawing up stock in order to fit the abutting ends to form neat close miter-joints, such as are desirable if not essential in the inside finishing of houses.

By my present invention I produce a device which can be applied to the stock to be sawed by merely placing it thereon and which may be readily adjusted, so as to secure an exact cut at any predetermined angle. My device is, moreover, durable and can be compactly folded, so as to occupy but little room in a carpenter's tool-chest or other place where it may be kept.

To the foregoing ends my invention consists of a saw-guide for aiding in cutting stock at any required angle embodying in its construction an angular base or bed adapted to be placed upon the stock to be sawed and a guide proper for the saw pivoted or hinged upon the end of the bed, the said guide being provided at one side with a segmental or curved arm, which extends through a slot in a standard or projection connected with the bed, in which slot the arm is adapted to be clamped, so as to hold the saw-guide in fixed position at any angle to which it may be adjusted.

Reference is to be had to the annexed drawings, and to the letters marked thereon, forming a part of this specification, the same letters designating the same parts or features, as the case may be, wherever they occur.

Of the drawings, Figure 1 is a plan view of my invention, showing it in position on stock to be sawed and illustrating also the manner in which the saw-guide may be adjusted. Fig. 2 is a front view of the same. Fig. 3 is an end view of the same. Fig. 4 is a sectional detail view showing a way of clamping or holding the saw-guide in any position to which it may be adjusted.

In the drawings, $a$ designates the base or bed of my improved saw-guide, which bed is constructed as an angle-iron—that is, with one part extending at a right angle to the other—so that it may be placed upon the edge of a piece of stock $b$ (see Figs. 1 and 4) to be sawed and be maintained in parallelism therewith. Any other form of bed that will secure this end or subserve this purpose will answer as well.

The saw-guide proper consists of a standard $c$, made in two parts and clamped together at their lower ends—as, for example, by a headed screw $s$, the shank of which extends through a hole formed in one part and tapped into the other part, so that the upper ends will be held together yieldingly, for a purpose to be presently explained.

Integrally connected with the upper end of each member of the standard $c$ is a plate $d$, which extends out at a right angle to the standard, so as to permit of the entrance of a saw-blade $e$ between them, the construction hereinbefore described for clamping the two members together providing means for pressing the plates $d$ against the sides of the saw-blade, so as to hold it in place with all necessary firmness and yet not so tightly as to prevent the saw from being freely manipulated.

Below the line where the plates $d$ are connected with the members of the standard one (or it may be both of the members) is cut away, as at $f$, to permit of the movement of the teeth of the saw in the said cut-away part without interference with any metallic part.

A screw $g$ may be turned in holes $h$, formed in the two members of the standard at any desired point, to support a block or piece of wood $i$ thereon, so that after the saw has cut through the stock being operated upon it may be stopped by the said block of wood.

The split or opening between the upper ends of the members of the standard, being, as it were, the heel or outer ends of the plates $d$, is flared outwardly in opposite directions, as at $j$, to facilitate entering the saw-blade between the two holding and guiding plates $d$.

The standard and connected saw holding and guiding plates are hinged to the base $a$, as at $k$, so that the guide-plates may be swung around at any angle with respect to the bed-plate, as is indicated in full and dotted lines in Fig. 1.

Pivotally connected at one end to one side of one of the plates $d$ is a segmental arm $l$, the free part of which passes through a slot $m$, formed in an upward projection $n$ from the base $a$, and tapped into the upper end of the said projection is a set-screw $o$, adapted to be turned down on the segmental arm and hold it in any position to which it may be adjusted or moved in the slot $m$. The bottom of the slot $m$ has a sharp ridge $p$ projecting up therefrom, which ridge is adapted to take into notches $q$, formed in the lower edge of the arm $l$. These notches may be so positioned that when they are engaged by the said rib they will adjust the guide-plates $d$ with respect to the bed, so as to enable the stock to be sawed to form octagon, hexagon, or square joints or joints of any other desired angle.

The manner of using the invention has been so fully and clearly indicated in describing its construction that it is believed that nothing more need be said on this point than that the operator will first adjust the guide-plates $d$ at the desired angle and then by placing the bed on the stock to be sawed will introduce the saw between the guide-plates and proceed with his work substantially the same as he would when employing the ordinary miter-box.

The simplicity and efficiency of the device and the readiness with which it may be used will now appear obvious.

It will be noticed that the two-part slotted post, to which the laterally-extending plates or guides $d$ are secured, is located outside of the plane of the inner face of the angle-plate or bed $a$, which line coincides with the outer edge of the material to be sawed, and, furthermore, that it extends below the line of movement of the saw, and that its point of union is below said line of movement. Since this arrangement leaves the plates entirely free from each other throughout, it permits the use of the device not only with the ordinary handsaw, but also with a hack-saw, bucksaw, crosscut-saw, or any kind of a saw having a frame extending above the blade. Another feature of importance is the arrangement of the notched adjusting segmental arm and the sharp ridge which engages the notches. As these notches would drop naturally over the ridge, the easy and absolutely accurate adjustment of the device is assured.

Having thus explained the nature of the invention and described a way of constructing and using the same, though without attempting to set forth all of the forms in which it may be made or all of the modes of its use, it is declared that what is claimed is—

In a saw-guide for sawing material to form miter-joints, the combination of a bed or frame adapted to fit the edge of the material to be sawed, a two-part slotted standard hinged to the bed outside of the line of the inner face of the bed, the parts of said standard being free above the lowest line of movement allowed to the saw and joined together below said line, each part being provided with a laterally-extending plate or frame, said plates being wholly separated from each other throughout, substantially as described.

In testimony whereof I have signed my name to this specification, in the presence of two subscribing witnesses, this 15th day of December, A. D. 1898.

CHARLES O. SEAVEY.

Witnesses:
ARTHUR W. CROSSLEY,
ANNIE J. DAILEY.